(12) United States Patent
Azeem

(10) Patent No.: US 11,966,770 B2
(45) Date of Patent: Apr. 23, 2024

(54) COLLABORATION ACROSS ISOLATED VIRTUAL ENVIRONMENTS

(71) Applicant: Salesforce, Inc., San Francisco, CA (US)

(72) Inventor: Fahad Azeem, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/835,165

(22) Filed: Jun. 8, 2022

(65) Prior Publication Data

US 2022/0374258 A1 Nov. 24, 2022

Related U.S. Application Data

(63) Continuation of application No. 16/528,461, filed on Jul. 31, 2019, now Pat. No. 11,385,921.

(51) Int. Cl.
*G06F 9/455* (2018.01)

(52) U.S. Cl.
CPC ............ *G06F 9/45558* (2013.01); *G06F 2009/45579* (2013.01); *G06F 2009/45583* (2013.01); *G06F 2009/45587* (2013.01); *G06F 2009/45595* (2013.01)

(58) Field of Classification Search
CPC ...... G06F 21/6218; G06F 16/21; G06F 21/62; G06F 21/6227; G06F 9/45558; G06F 2009/45583; G06F 2009/45587; G06F 2009/45595; G06F 16/27; G06F 2009/45579; G06Q 50/01
See application file for complete search history.

(56) References Cited

U.S. PATENT DOCUMENTS

| | | | |
|---|---|---|---|
| 2014/0007189 A1 | 1/2014 | Huynh | |
| 2015/0139238 A1* | 5/2015 | Pourzandi | H04L 41/40 370/392 |
| 2015/0163206 A1* | 6/2015 | McCarthy | H04L 63/104 726/4 |
| 2015/0236998 A1 | 8/2015 | Verma | |
| 2015/0310188 A1* | 10/2015 | Ford | H04L 63/0428 726/28 |
| 2017/0180475 A1* | 6/2017 | Micucci | H04L 67/55 |
| 2019/0188763 A1* | 6/2019 | Ye | H04L 43/0876 |

* cited by examiner

*Primary Examiner* — Kenneth Tang
(74) *Attorney, Agent, or Firm* — Butzel Long; Donald J. Lecher

(57) ABSTRACT

A system can allow collaboration between two or more tenants in a multi-tenant system. Each tenant can share a common access to a processing space and a data storage device. Each tenant can be assigned to a virtual environment having a dedicated portion of the data storage device. The system can create a database record in a first dedicated portion assigned to the first tenant. The database record can be displayed on a user interface of the first tenant and include a collaboration tool component embedded within the database record. The database record can be transmitted to a database and transmitted from the database to a second dedicated portion of the data storage device. The second dedicated portion can be assigned to a second tenant of the multi-tenant system.

14 Claims, 6 Drawing Sheets

COLLABORATION ACROSS ISOLATED VIRTUAL ENVIRONMENTS

BACKGROUND

Multi-tenant cloud-based architectures may improve collaboration, integration, and community-based cooperation between tenants without sacrificing data security. In a multi-tenant system, a hardware and software platform may simultaneously support multiple tenants from a common data store and common processing space. Each tenant may be assigned to a virtual computing environment that corresponds to a dedicated portion of the common data store. A tenant may be, for example, a user, a group of users, a website, a mobile application, an e-commerce store, an application programming interface (API), or the like. Multi-tenant architectures may allow for execution of applications within the common processing space, thereby simplifying access to specific sets of data for any tenant or user. Similarly, applications and services may be more easily shared between multiple tenants.

The dedicated portion of the common data store that is assigned to a virtual computing environment may be isolated from all other tenants for reasons relating to privacy, security, or other concerns. As a result, users belonging to a first tenant that wish to collaborate and share data with other users belonging to another tenant may be unable to do so due to constraints imposed by the multi-tenant cloud-based architecture.

BRIEF SUMMARY

According to an embodiment of the disclosed subject matter, a computer-implemented method of collaborating between two or more tenants in a system having a plurality of tenants may be provided. Each tenant may include one or more entities that share a common access to a processing space and a data storage device. The processing space may be implemented on at least one of a plurality of instance nodes in communication with one another. Each tenant of the plurality of tenants may be assigned to a virtual environment having a dedicated portion of the data storage device that may be isolated from the virtual environments of the one or more other tenants. The method may include creating a database record in a first dedicated portion of the data storage device. The first dedicated portion may be assigned to a first tenant of the plurality of tenants. The method may display the database record on a first tenant user interface. The first tenant user interface may include a collaboration tool component embedded within the database record. The method may include transmitting the database record to a database in response to creating or modifying the database record. The method may further include storing the database record in the database and transmitting the database record from the database to a second dedicated portion of the data storage device. The second dedicated portion may be assigned to a second tenant of the plurality of tenants. Transmitting the database record from the database to the second dedicated portion may occur in response to determining that the database record was stored in the database. The method may further include displaying the database record on a second tenant user interface. The second tenant user interface may include the collaboration tool component embedded within the database record. The method may further include inserting a data object into a first data content portion of the database record using the collaboration tool component of the first tenant user interface. The method may further include synchronizing the first data object of the database record with a second data content portion of the database record on the second tenant user interface. The synchronizing may not utilize the database. The data object sourced from a uniform resource locator (URL). The method may further include modifying the data object by accessing the source URL directly using a web browser and without utilizing the embedded collaboration tool component. The method may further include synchronizing the modifications made to the data object by accessing the URL directly with the first data content portion or the second data content portion of the data record. A first record identifier that identifies the database record in the first dedicated portion may be different from a second record identifier that may identify the database record in the second dedicated portion. The method may further include synchronizing the database record in the first dedicated portion with the database record stored in the second dedicated portion. The synchronizing may utilize the database in response to changes to the database record occurring in the first dedicated portion or in the second dedicated portion.

According to an embodiment of the disclosed subject matter, system for collaborating between two or more tenants in a system having a plurality of tenants may be provided. Each tenant may include one or more entities that share a common access to a processing space and a data storage device. The processing space may be implemented on at least one of a plurality of instance nodes in communication with one another. Each tenant of the plurality of tenants may be assigned to a virtual environment having a dedicated portion of the data storage device that may be isolated from the virtual environments of the one or more other tenants. The system may include a processor and a memory. The memory may be in communication with the processor. The memory may store a plurality of instructions executable by the processor to cause the system to create a database record in a first dedicated portion of the data storage device. The first dedicated portion may be assigned to a first tenant of the plurality of tenants. Instructions may be further provided to display the database record on a first tenant user interface. The first tenant user interface may include a collaboration tool component embedded within the database record. Instructions may be further provided to transmit the database record to a database in response to creating or modifying the database record and store the database record in the database. Instructions may be further provided to transmit the database record from the database to a second dedicated portion of the data storage device. The second dedicated portion may be assigned to a second tenant of the plurality of tenants. The instructions executable by the processor to cause the system to transmit the database record from the database to the second dedicated portion may occur in response to a determination that the database record was stored in the database. Instructions may be further provided to cause the system to display the database record on a second tenant user interface. The second tenant user interface may include the collaboration tool component embedded within the database record. Instructions may be further provided to cause the system to insert a data object into a first data content portion of the database record using the collaboration tool component of the first tenant user interface. Instructions may be further provided to synchronize the first data object of the database record with a second data content portion of the database record on the second tenant user interface. Instructions may be further provided to cause the system to synchronize does not utilize the database. The data object may be sourced from a uniform resource locator (URL). Instructions may be further provided to cause the system to modify the data object by accessing the source URL directly using a web browser and without utilizing the embedded collaboration tool component. Instructions may be further provided to cause the system to synchronize the modifications made to the data object by accessing the URL directly with the first data content portion or the second data content portion of the data record. A first record identifier that may identify the database record in the first dedicated portion may be different from a second record identifier that may identify the database record in the second dedicated portion. Instructions may be further provided to cause the system to synchronize the database record in the first dedicated portion with the database record stored in the second dedicated portion. The instructions executable by the processor to cause the system to synchronize may utilize the database in response to changes to the database record occurring in the first dedicated portion or in the second dedicated portion.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Due to the architecture of the multi-tenant cloud-based architecture, each tenant may more easily share applications and services. On the other hand, data stored in the virtual environment of one tenant may be isolated and inaccessible to the virtual environment of another tenant. As a result, users belonging to different tenancies may be unable to collaborate using data that is stored across the multiple virtual environments. Users belonging to different tenancies may wish to collaborate across virtual environments for a variety of reasons, including global account planning, case management, and team sales efforts, for example.

The present subject matter discloses a method of collaborating between users across the system-imposed data boundaries of a multi-tenant cloud-based architecture. The disclosed method may allow software applications designed to function within a single virtual environment to transfer data and permit collaboration between users of multiple tenants across their associated multiple virtual environments.

The term "tenant" as used herein refers to one or more entities, where each entity may be user, a group of users, a website, a mobile application, an e-commerce store, an API, or the like. One or more entities within a tenant may share common data, stored in a database, with the other entities within that same tenant. Tenants may be representative of customers, customer departments, business or legal organizations, or other groups that maintain data for sets of users within the system. Although multiple tenants may share access to system resources, processing spaces, and data stores, the data and services provided to each tenant may be securely isolated from the data and services provided to other tenants. In this way, the multi-tenant system may allow different sets of entities to share functionality without necessarily sharing any data.

In an embodiment, the customers, employees, or other users described in the present subject matter are users of a social network. Social networks may facilitate communication and collaboration amongst users. One example of a social network application is Quip®, provided by salesforce.com, inc. Quip® and other social network applications may be provided in a multi-tenant cloud-based architecture, as described herein. Some described products and features may be implemented without installing software on the user's local machine. Rather, the products and features may be provided in the form of a service and may be enabled or disabled by the user at will. It should be appreciated that the disclosed techniques of the present subject matter are not limited to Quip® nor products and services provided by salesforce.com, inc. or even social network applications generally. Rather, the disclosed techniques may be implemented in the context of various other database systems, such as cloud-based systems that are not part of a multi-tenant database system.

Figure 1A:
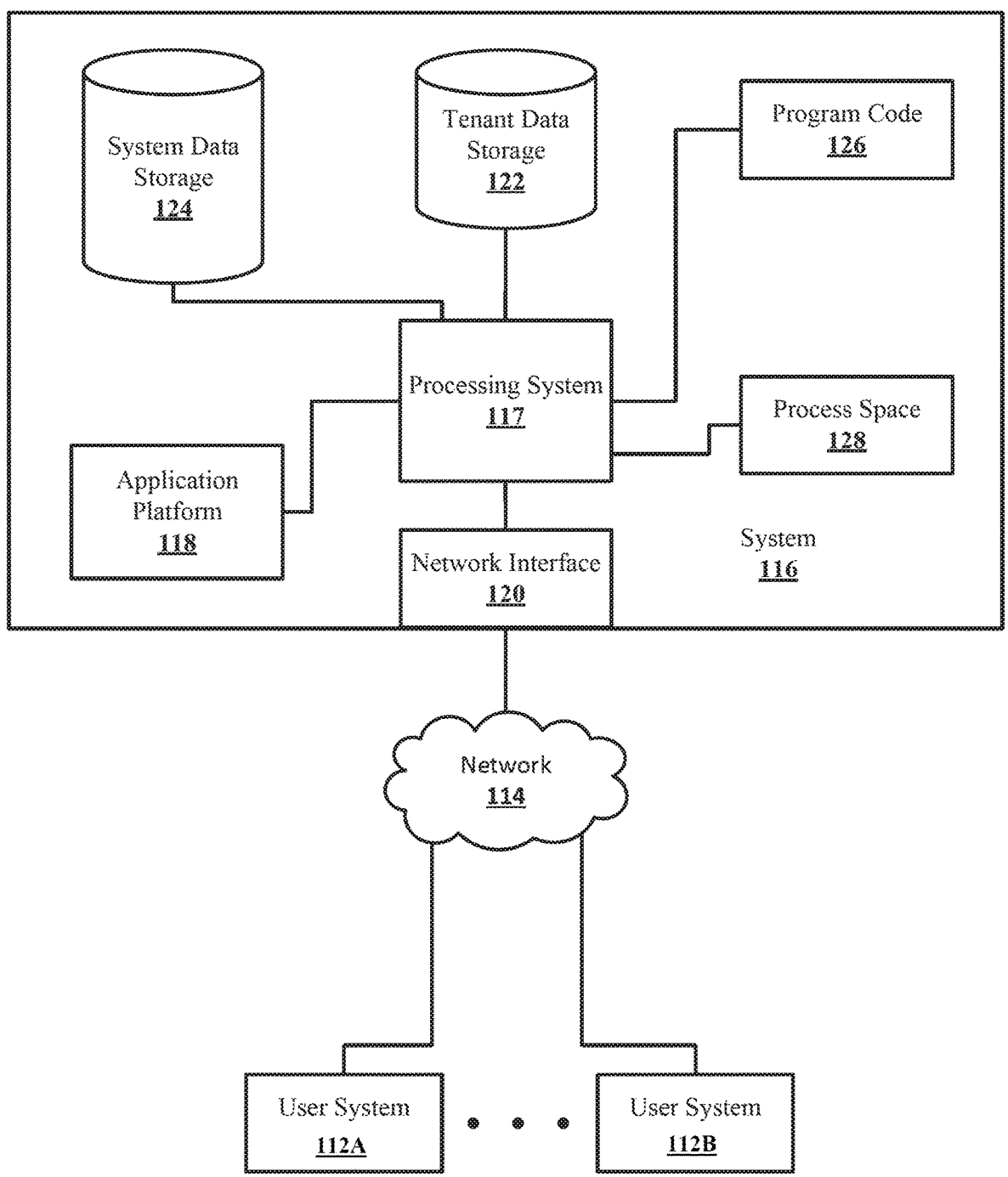
FIG. 1A illustrates an example of a system according to an embodiment of the disclosed subject matter.

FIG. 1A shows a block diagram of an example of a multi-tenant environment 100. The multi-tenant environment 100 may include user systems 112A and 112B, a network 114, a cloud-based database system 116, a processing system 117, an application platform 118, a network interface 120, tenant database 122 for storing tenant data, system database 24 for storing system data, program code 126 for implementing various functions of the database system 116, and process space 128 for executing database system processes and tenant-specific processes, such as running applications as part of an application hosting service. It should be understood that multi-tenant environment 100 may not have all of the aforementioned components and systems, or may have other components and systems instead of, or in addition to, those listed above. In an embodiment, an on-demand database service may exist within multi-tenant environment 100.

An on-demand database service, which may be implemented using database system 116, as used herein refers to a service that is made available to users outside of the entities that own, maintain, or provide access to the database system 116. The users of an on-demand database service may not generally be concerned with constructing or maintaining the database system 116. Instead, resources provided by the database system 116 may be available for use when the users request various services provided by the system 16 upon the demand of the users.

Some on-demand database services may store information from one or more tenants into tables of a common database image to form a multi-tenant database system. The term "multi-tenant database system," as used herein refers to those systems in which various elements of hardware and software of a database system may be shared by one or more customers or tenants. For example, a given application server may simultaneously process requests for several tenants, and a given database table may store rows of data for a potentially much greater number of tenants.

Application platform 118 may be a framework that allows the applications of database system 116 to execute, such as the hardware or software infrastructure of the database system 116. The application platform 118 may enable the creation, management, and execution of one or more applications developed by the provider of the on-demand database service, users accessing the on-demand database service via user systems 112A and 112B, or third party application developers accessing the on-demand database service via user systems 112A and 112B.

Database system 116 may implement a web-based customer relationship management (CRM) system. For example, the database system 116 may include application servers configured to implement and execute CRM software applications and may provide related data, code, forms, web pages, documents, and other information between user systems 112A and 112B, and store and retrieve from database system related data, objects, and web content. The data assigned to the virtual computing environment for each tenant of the multiple tenants may be stored in the same physical data storage device in tenant data storage 122. Tenant data may be arranged in the tenant data storage 122 such that data of one tenant is kept logically separate from the data of other tenants, so that one tenant may not have access to another tenant's data. The database system 116 may also implement applications other than, or in addition to, a CRM application. For example, the database system 116 may provide tenant access to multiple hosted applications, such as a gaming or sports-betting application. Third-party developer applications, which may or may not include CRM, may be supported by the application platform 118. Application platform 118 may manage the creation and storage of the applications into one or more database objects and the execution of the applications in one or more virtual machines of the process space of the database system 116.

In an embodiment, database system 116 is configured to provide web pages, forms, applications, data and media content to user systems 112A and 112B to support access by user systems 12 as tenants of database system 116. As such, database system 116 may provide security mechanisms to keep each tenant's data isolated from the data of all other tenants. If more than one multi-tenant system is used, they may be in close proximity to one another, for example, in a server farm located in a single building, or they may be distributed at locations relatively remote from one another. Each multi-tenant system may include one or more logically or physically-connected servers distributed locally or across one or more geographic locations. The term "server," as used herein refers to a computing device or system, including processing hardware and process space, an associated storage medium, such as a memory device or database, and in some instances, a database application. It should also be understood that the database objects described herein may be implemented as part of a single database, a distributed database, a collection of distributed data bases, a database with redundant online or offline backups, or other redundancies and may include a distributed database or storage network with an associated processing capability.

The network 114 may be or include any network or combination of networks of systems or devices that communicate with one another. For example, the network 114 may be or include any one or any combination of a LAN (local area network), WAN (wide area network), telephone network, wireless network, cellular network, point-to-point network, star network, token ring network, hub network, and the like. The network 114 may include a TCP/IP (Transfer Control Protocol and Internet Protocol) network, such as the Internet. It should be understood that the networks that the disclosed implementations may use are not so limited.

The user systems 112A and 112B may communicate with database system 116 using TCP/IP and at a higher network level, other Internet protocols, such as HTTP, FTP, AFS, WAP, etc. In an example where HTTP is used, each user system 112A and 112B may include an HTTP client, such as a web browser for sending and receiving HTTP signals to and from an HTTP server of the database system 116. Such an HTTP server may be implemented as the sole network interface 120 between the database system 116 and the network 114. In an embodiment, the network interface 120 between the database system 116 and the network 114 may include load sharing functionality, such as round-robin HTTP request distributors to balance loads and distribute incoming HTTP requests evenly over several servers.

Each user system 112A or 112B may execute an HTTP client, for example, a web browser application. Each user system 112A or 112B also may include one or more user input devices for interacting with a graphical user interface (GUI) provided by the browser on a display of the user system 112A or 112B in conjunction with pages, forms, applications and other information provided by the database system 116 or other systems or servers. For example, the user interface device may be used to access data and applications hosted by database system 116, and to perform searches on stored data, and otherwise allow a user to interact with various GUI pages that may be presented to a user.

The users of user systems 112A and 112B may differ in their respective capacities, and the capacity of a user system 112A or 112B may be determined by permissions for the current user of such user system. For example, where a salesperson is using a user system 112A or 112B to interact with the database system 116, that user system 112A or 112B may have the capacities allotted to the salesperson. However, while an administrator may be using that user system 112A or 112B to interact with the database system 116, that user system 112A or 112B may have the capacities allotted to that administrator. Where a hierarchical role model may be used, users at one permission level may have access to applications, data, and database information accessible by a lower permission level user, but may not have access to certain applications, database information, and data accessible by a user at a higher permission level. Therefore, different users may generally have different capabilities in terms of accessing and modifying application and database information, depending on the users' respective security permissions.

Figure 1B:
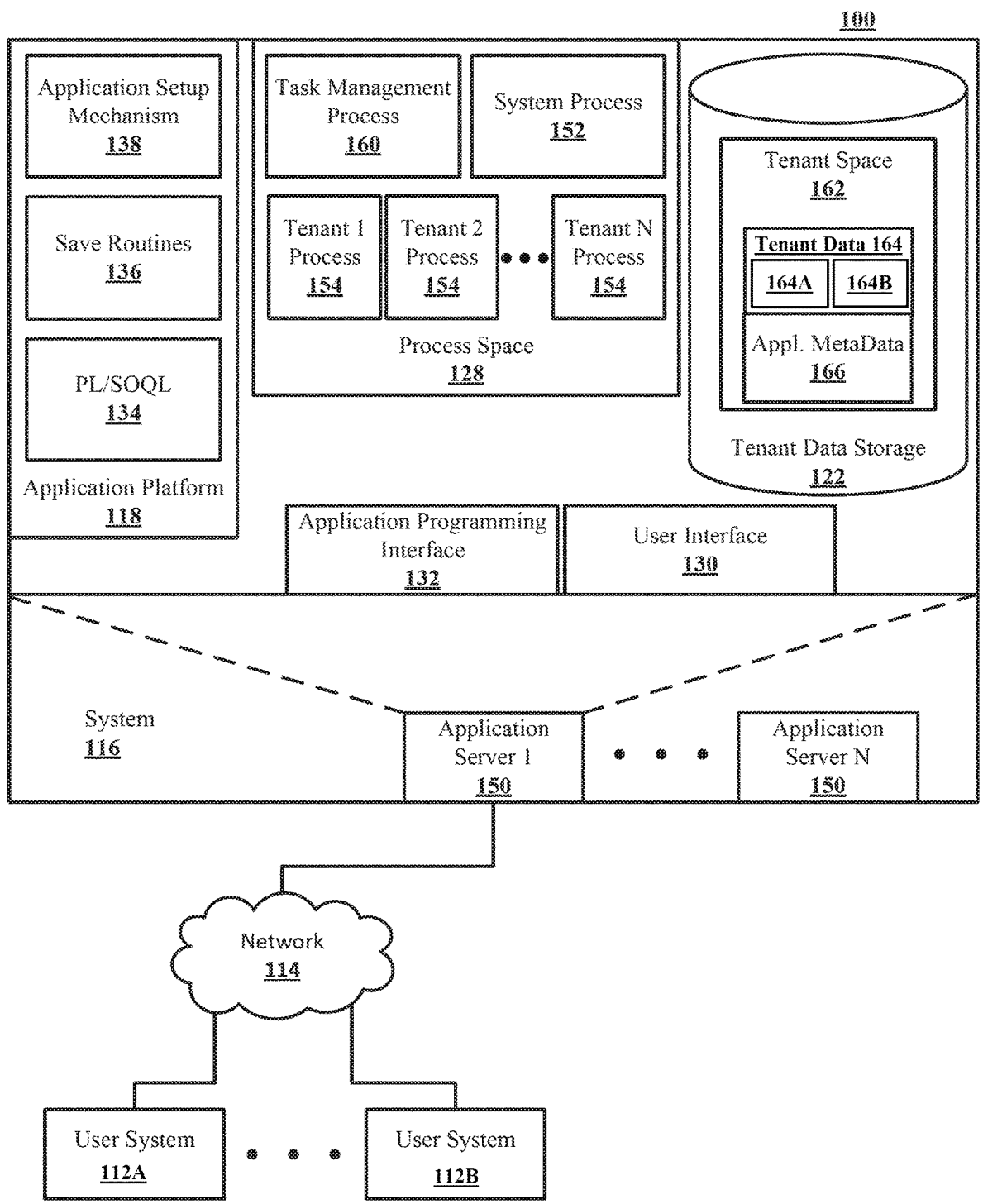
FIG. 1B illustrates an example of a system according to an embodiment of the disclosed subject matter.

FIG. 1B shows a block diagram of an embodiment of several of the elements of FIG. 1A with additional detail. As shown in FIG. 1B, the network interface 120 may be implemented as a set of HTTP application servers 150. Each of the application servers 150 may be configured to communicate with tenant data storage 122 and the tenant data therein, as well as system data storage 124 and the system data therein, to serve requests received from the user systems 112A and 112B. The tenant data may be divided into individual tenant storage spaces 162, which may be physically or logically arranged or divided. Within each tenant storage space 162, user storage 164 and application metadata 166 may be similarly allocated for each user. For example, a copy of a user's most recently used (MRU) items may be stored to user storage 164. Similarly, a copy of MRU items for an entire organization forming a tenant may be stored in tenant storage space 162.

The process space 128 may include a system process space 152, individual tenant process spaces 154, and a task management process space 160. The application platform 118 may include an application setup mechanism 138 that may support application developers' creation and management of applications. Such applications and others may be saved as metadata into tenant data storage 122 by save routines 136 for execution by users as one or more tenant process spaces 154 managed by tenant management process 160, for example. Invocations to such applications may be coded using PL/SOQL 134, which may provide a programming language style interface extension to API 132. Invocations to applications may be detected by one or more system processes, which may manage retrieving application metadata 166 for the subscriber making the invocation and executing the metadata as an application in a virtual machine.

Each application server 150 may be communicably coupled with tenant database 122 and system database 14, for example, having access to tenant data and system data, respectively, via a different network connection. For example, one application server 150 may be coupled via the network 114, another application server 150 may be coupled via a direct network link, and another application server 150 may be coupled by yet a different network connection.

Each application server 150 may be configured to handle requests for any user associated with any organization that is a tenant of the database system 116. Application servers 150 may be added and removed from the server pool at any time and any reason. In an embodiment, there may be no server affinity for a user or organization to a specific application server 150. An interface system implementing a load balancing function may be communicably coupled between the application servers 150 and the user systems 112A and 112B to distribute requests to the application servers 150. In an example, the load balancer uses a least-connections algorithm to route user requests to the application servers 150. Other examples of load balancing algorithms, such as round robin and observed-response-time, may also be used. In an example, database system 116 may be a multi-tenant system that handles storage and access to different objects, data, and applications across disparate users and organizations.

In an example, one tenant may be a company that employs a sales team where each salesperson may use database system 116 to manage various aspects of their sales. A user may maintain contact data, leads data, customer follow-up data, performance data, goals and progress data in tenant data storage 122. In another example, because all the data and applications may be maintained and accessed by a user system 112A or 112B having little more than network access, the user may manage his or her sales efforts and cycles from any of the multiple user systems 112A and 112B.

While each user's data may be stored separately from other users' data regardless of the associated organizations of each user, some data may be shared across throughout the organization or may be accessible by several users of all the users for a given organization that forms a tenant. Thus, some data structures managed by database system 116 may be allocated at the tenant level while other data structures may be managed at the user level. Because a multi-tenant system may support multiple tenants including possible competitors, the multi-tenant system may have security protocols that keep data, applications, and application use separate. Some tenants may opt for access to a multi-tenant system rather than maintain their own system. The multi-tenant system may provide greater redundancy, uptime, and backup storage with lower overhead and at a lower cost. In addition to user-specific data and tenant-specific data, the database system 116 may also maintain system-level data usable by multiple tenants or other data. System-level data may include industry reports, news, postings, and the like that are sharable among tenants.

The user systems 112A and 112B may communicate with the application servers 150 to request and update system-level and tenant-level data from the database system 116. Such requests and updates may involve sending one or more queries to tenant database 122 or system database 124. Application server 150 may automatically generate one or more SQL statements designed to access the desired information. System data storage 124 may generate queries to access the requested data from the database.

Each database may generally be viewed as a collection of objects, such as a set of logical tables, containing data fitted into predefined or customizable categories. A "table" as used herein refers to one representation of a data object and may be used to simplify the conceptual description of objects and custom objects. Each table may generally contain one or more data categories logically arranged as columns or fields in a viewable schema. Each row or element of a table may contain an instance of data for each category defined by the fields. For example, a CRM database may include a table that describes a customer with fields for basic contact information, such as name, address, phone number, fax number, etc. Another table may describe a purchase order, including fields for information such as customer, product, sale price, date, etc. In some multi-tenant system embodiments, standard entity tables may be provided for use by all tenants. For CRM database applications, such standard entities may include tables for case, account, contact, lead, and opportunity data objects, each containing pre-defined fields.

In some multi-tenant system embodiments, tenants may be allowed to create and store custom objects or may be allowed to customize standard entities or objects, for example by creating custom fields and indexes for standard objects. In an example, all custom entity data rows may be stored in a single multi-tenant physical table, which may contain multiple logical tables per organization. It may be transparent to users that their multiple "tables' may be stored in one large table or that their data may be stored in the same table as the data of other users.

A social network application may be implemented to connect users within a business corporation, partnership or organization, or a group of users. The social network application may be used by users who are employees in a business organization to share data, communicate, and collaborate with each other for various enterprise-related purposes. Each user of the database system 116 may be assigned to a "user profile." A user profile, as used herein, refers to a collection of data about a given user. The data may include general information, such as a name, a title, a phone number, a photo, a biographical summary, or a status (for example, text describing what the user is currently doing, thinking or expressing). The data associated with a user profile may also include various permissions defining the ability of the user to interact with various data objects. Where there are multiple tenants, a user may be associated with a particular tenant as an employee, officer, contractor, and the like. For example, a user may be a salesperson of an organization that is a tenant of the database system 116. The social network application may maintain real-time or nearly real-time updates by periodically synchronizing records amongst all users of the social network application. For example, the social network application may allow a user to see which user(s) are currently viewing a same data object, to see one or more users make edits to a data object in real-time, allow two or more users to make concurrent edits to the same data object, and receive notifications when a user has viewed a data object or is typing a message. Each record in the social network application may be accessible via a uniform resource locator (URL) link, which may contain or be otherwise associated with a unique record number.

A "record," as used herein refers to a data entity, such as an instance of a data object created by a user or a group of users of the database system 116. Each record may be identified by a record identifier that may be unique at least within the respective organization. Such records may include, for example, data objects representing and maintaining data for accounts. Each record may be assigned to a record type. Examples of account record types may include: customers, customer support, households, partners, suppliers, and other organizations. Other examples of record types may include cases, opportunities, leads, projects, contracts, orders, price books, products, solutions, reports and forecasts, among other possibilities. As another example, a record such as an account record itself may include a number of records. For example, a customer account may include opportunities, contracts, and orders. A record may also include various data fields and controls that are defined by the structure or layout of the object. A record may also have custom fields defined by a user or organization. A field may include, or include a link to, another record, thereby providing a parent-child relationship between the records.

Records may also have various visibilities to users within the social network. For example, some records may be private while others may be public. To access a private record and to publish and view feed items on the records record feed, a user may request to be subscribed to the record and be accepted by, for example, an administrator or owner of the record, be invited to subscribe to the record and accept, be directly subscribed to the record or be shared the record for example, by an administrator or owner of the record. Any user within the social network may subscribe to or follow a public record within the social network.

In an embodiment, users may access one or more network feeds, which may include publications presented as feed items or entries in the feed. A network feed may be displayed in a graphical user interface (GUI) on a display device such as the display of a user's computing device as described above. The publications may include various social network information or data from various sources and may be stored in the database system 116, for example, in tenant data storage 122. In an example, feed items of information for or about a user may be presented in a respective user feed, feed items of information for or about a group may be presented in a respective group feed, and feed items of information for or about a record may be presented in a respective record feed. A second user following a first user, a first group, or a first record may automatically receive the feed items associated with the first user, the first group or the first record for display in the second user's news feed. A user feed may also display feed items from the group feeds of the groups the respective user subscribes to, as well as feed items from the record feeds of the records the respective user subscribes to.

A network feed may be specific to an individual user of an online social network. For example, a user news feed generally refers to an aggregation of feed items generated for a particular user and may be viewable only to the respective user on a home page of the user. A user profile feed is another type of user feed that may refer to an aggregation of feed items generated by or for a particular user and may be viewable only by the respective user and other users following the user on a profile page of the user. In an example, the feed items in a user profile feed may include posts and comments that other users make about or send to the particular user, and status updates made by the particular user. In an example, the feed items in a user profile feed may include posts made by the particular user and feed-tracked updates initiated based on actions of the particular user.

Data may be stored in database system 116, including tenant database 122, in the form of "entity objects." Entities may be categorized into "records objects' and "collaboration objects." In an embodiment, the records object includes all records in the social network. Each record may be considered a sub-object of the overarching records object. Collaboration objects may include, for example, a "users object," a "groups object," a "group-user relationship object," and a "record-user relationship object." The users object may be a data structure that may be represented or conceptualized as a "users table' that associates users to information about or pertaining to the respective users including, for example, metadata about the users. The users table may include all of the users within an organization. A users table may exist for each division, department, team or other sub-organization within an organization. Where the organization may be a tenant of a multi-tenant social network platform, the users table may include all of the users within all of the organizations that are tenants of the multi-tenant social network platform. Each user may be identified by a user identifier that may be unique at least within the user's respective organization. Each organization may also have a unique organization identifier.

The records object may be a data structure that may be represented or conceptualized as a "records table' that may associate records to information about or pertaining to the respective records including, for example, metadata about the records. The records table may include all of the records within the organization. A records table may exist for each division, department, team or other sub-organization within an organization. Where the organization may be a tenant of a multi-tenant social network platform, the records table may include all the records within all of the organizations that are tenants of the multi-tenant social network platform.

Figure 2:
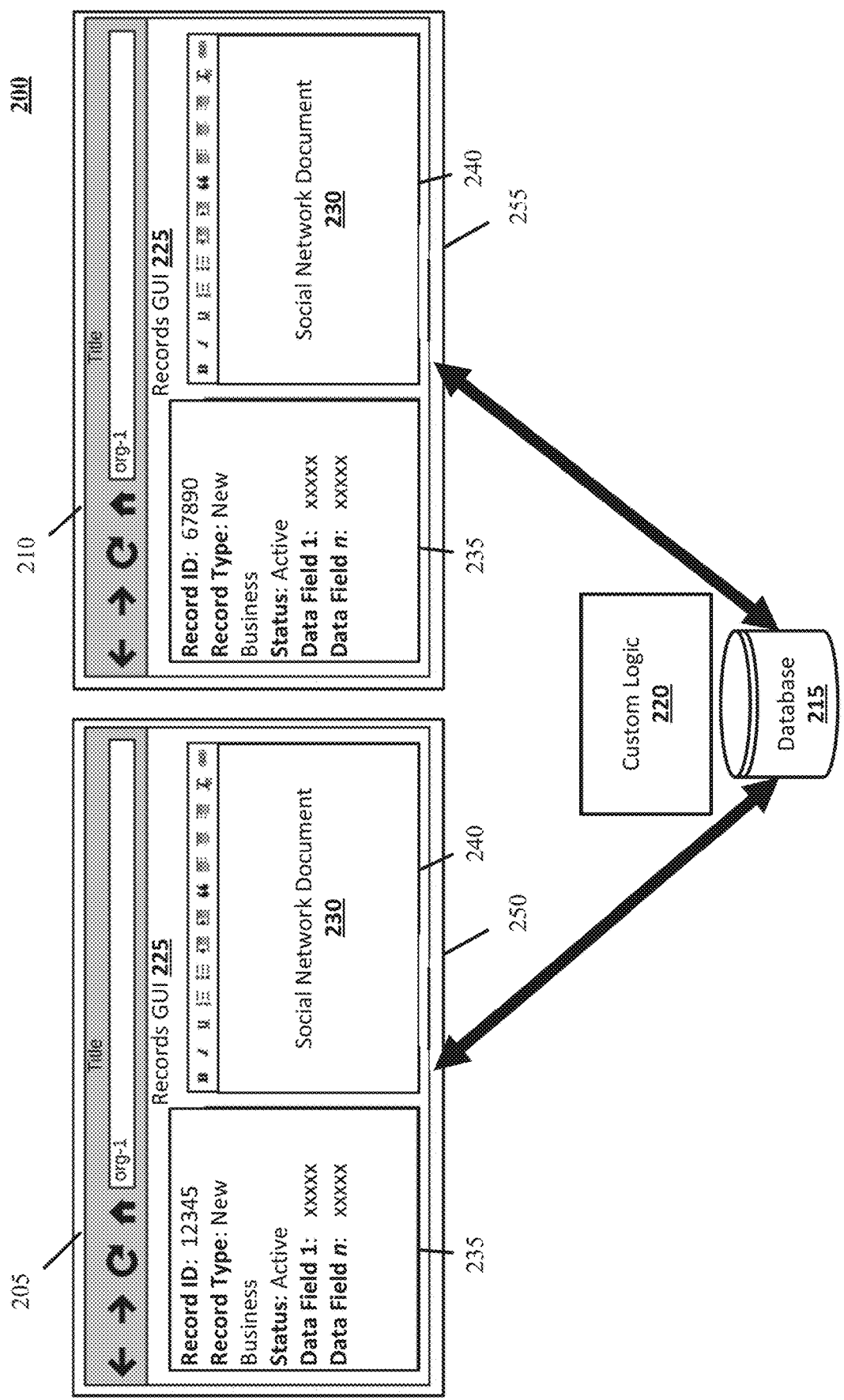
FIG. 2 illustrates an example of a synchronization technique according to an embodiment of the disclosed subject matter.

FIG. 2 is a block diagram illustrating a technique 200 to collaborate across isolated virtual environments 250/255 of a first and second tenant. A first user of first user system 112A may wish to collaborate by communicating and sharing data with a second user using a second user system 112B. The first user may use a web browser 205 connected with his or her associated first tenant data storage 164A of a first virtual environment 250, while the second user may use a web browser 210 connected with his or her associated second tenant data storage 164B of a second virtual environment 255. As previously discussed, while all tenant data may be commonly stored within tenant data storage medium 122, the data may be kept logically separate so that one tenant may not access another tenant's data. The first and second users may use an HTTP client such as web browsers 205 and 210, which may be provided on the first user system 112A and second user system 112B, respectively. The web browsers 205 and 210 may be directed to load a user interface 130 or a web page that allows for viewing the records 235 of the corresponding tenant organization stored in tenant data storage 164. Each record 235 may include a plurality of data fields, including customizable data fields, as previously described. The user interface 130 may allow for embedding a social network application control 240 within each record 235. Each embedded social network application control 240 may allow embedding one or more data object(s) 230 into each record 235. Data object(s) 230 may be hosted on the social network website or in an otherwise social network-associated data store. Incorporating a social network data object 230 may be achieved by inputting the associated URL to the record within the social network application control 240. The URL may be input to a web browser to access a data object associated with the social network record directly without utilizing the records GUI 225 and social network application control 240. Once accessed, the data object may be modified or deleted. In an embodiment, the URL may direct a web browser to a social network website that hosts a plurality of user profiles, and a plurality of social network records containing data objects and communications.

One or more application programming interfaces (APIs) 132 may be installed in database system 116 to allow the users and developers of user systems 112A and 112B to extend the features and services of database system 116. In an embodiment, a user of user system 112A or 112B may install a synchronization API 132 that may enable the user to synchronize tenant space 162 with an external database 215. Configuration of the synchronization API 132 may be achieved using a GUI or command line interface (CLI) provided through user interface 130. Configuration settings of the synchronization API 132 may include, for example, the location of a source and destination selected database, the database schema name, a port, the selected database credentials, the polling frequency of the synchronization, which may set how often the database 215 and/or the tenant data storage 164 should be checked and synchronized with updates, the locations or pathnames of data to be synchronized. The synchronization API 132 may allow real-time or near-real-time synchronization between the tenant data storage 164 and an external database 215. "External," as used herein in the context of database 215 refers to a database that is not located within database system 116 and can be accessed via network 114 or another communication network from database system 116. In an embodiment, database 215 may be a Postgres database. Synchronization API 132 may also allow unidirectional or bidirectional synchronization. Synchronization API 132 may allow for synchronizing the entirety of tenant space 162 with database 215, a portion of tenant space 162, or only a single data object, as configured by the user. Custom logic 220 may detect a change, such as a new, modified, updated, or deleted database record in database 215 and propagate the changes from tenant storage 164 associated with the first virtual environment 250 to the tenant storage 164 associated with the second virtual environment 255, thereby bypassing the logical separation previously discussed that may prohibit transferring data between tenants and their associated virtual environments. Similarly, another entity may be permitted to connect with database 215 to add, modify, remove, or update a record. In this example, changes may be detected by custom logic 220 and propagated to the first 250, second 255, or both tenant virtual environments based on whether the synchronization between the database 215 and each respective virtual environment 250, 255 has been configured for unidirectional or bidirectional synchronization. It should be understood that synchronization API 132 may synchronize at the record-level, including the initial record 235 containing the social network data object 230. After this record 235 has been synchronized, further updates to add, delete, modify, or otherwise update the social network data object 230 may be handled by the social network application control 240 at the social network data object-level and may not involve synchronization API 132 or database 215 unless the record 235 itself is updated.

Figure 3:
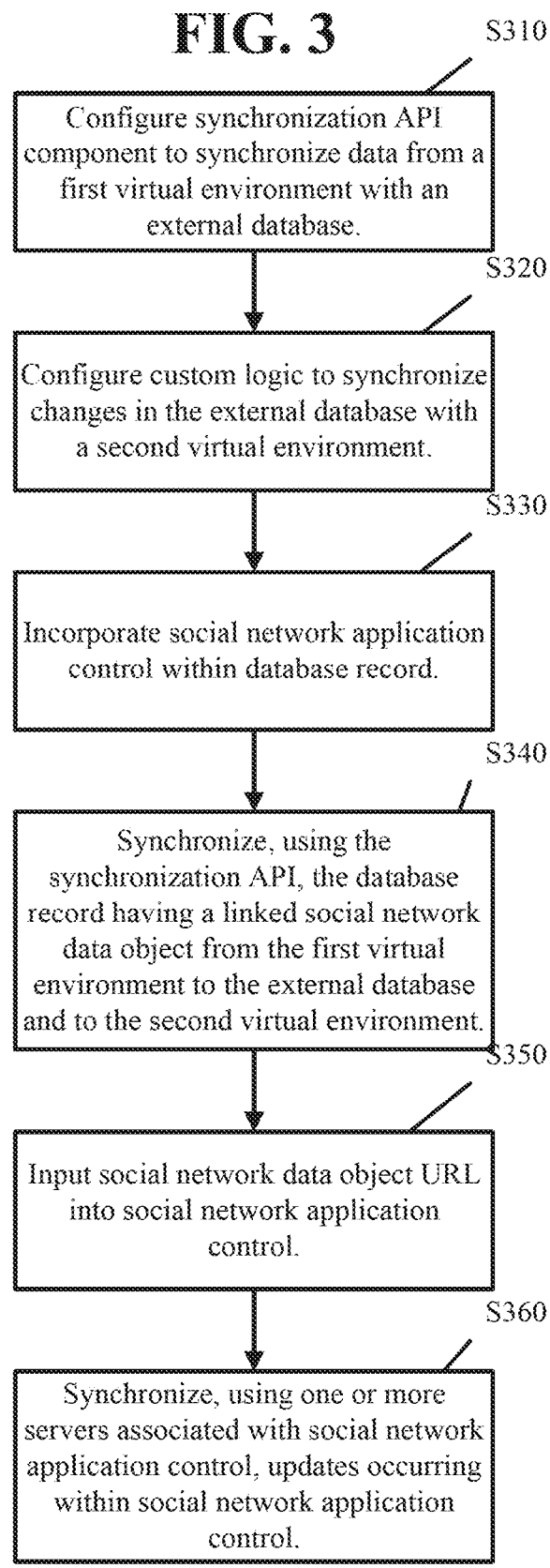
FIG. 3 illustrates a flow diagram of a method according to an embodiment of the disclosed subject matter.

FIG. 3 is a flow diagram illustrating an example of a method 300 for achieving collaboration and data-transfer across isolated virtual environments. The process shown in FIG. 3 may be performed, for example, via the combination of database 215, custom logic 220, database system 116, and user system(s) 112A and 112B. Method 300 may begin in S310 by configuring a synchronization API 132 via a GUI 225 or CLI to identify the location of the selected source and destination database, port, credentials, polling frequency, database schema names, and specifying the data object(s) to be synchronized. Upon successfully configuring the synchronization API 132, one or more data record(s) 235 of a first virtual environment 250, when configured, may be synchronized with an external database 215. Custom logic 220 may be configured in S320 to detect a change, such as a new, modified, updated, or deleted record in database 215 and propagate the changes from tenant storage 164A associated with the first virtual environment 250 to the tenant storage 164B associated with the second virtual environment 255, and vice-versa, thereby bypassing the logical separation that may prohibit transferring data between tenants and their associated virtual environments. In S330, a new record 235 may be created or an existing record 235 modified, using a web browser 205/210, to incorporate a social network application control 240. In an embodiment, creating a new record may automatically incorporate the social network application control 240 by default. At S340, the database record 235, newly-updated to reflect the addition of a social network application control 240, may be synchronized via the synchronization API 132, based on the polling frequency, with external database 215. Custom logic 220, detecting the update to external database 215, may synchronize the database record 235 stored in external database 215 with a data store, such as tenant storage 164B of a second virtual environment 255. In S350, social network application control 240 may allow a user to incorporate one or more social network data object(s) 230, hosted on a social network website or associated data store into record 235. Following in S360, updates made within a windowed portion of the social network application control 240 to one or more data objects 230 may be synchronized via a backend process of the social network application control 240 that may occur using one or more servers associated with the social network and may not involve synchronization API 132. On the other hand, updates made to database record 235 using records GUI 225, and not social network application control 240, may be synchronized via the synchronization API 132 with external database 215. It should be appreciated that either a first or second user of a first 205 or second 210 web browser may make updates, additions, deletions, and modifications to record 235 that will reflect in real-time or near-real-time on the opposing virtual environment 250/255 once the synchronization API 132 has been configured. It should be appreciated that while the data content of database record 235 may be identical on each of the first virtual environment 250, second virtual environment 255, and external database 215, the record ID may be different on each. Furthermore, it should be appreciated the presently disclosed subject matter may not be limited to synchronization between a first 250 and second 255 virtual environment and a single external database 215. Rather, synchronization API 132 may be configured to synchronize across many additional virtual environments incorporating as many external databases 215 as practical.

Embodiments disclosed herein may allow for overcoming the barrier to data sharing and collaboration across isolated virtual environments. In this way, the utility of social network applications designed to allow users of the same tenant to collaborate within the same virtual environment may be expanded to allow collaboration between different tenants across different virtual environments. This is due to the use of the synchronization technique in combination with a social network collaboration tool and a database system that supports expanding its features via the addition of API-based products and services.

Figure 4:
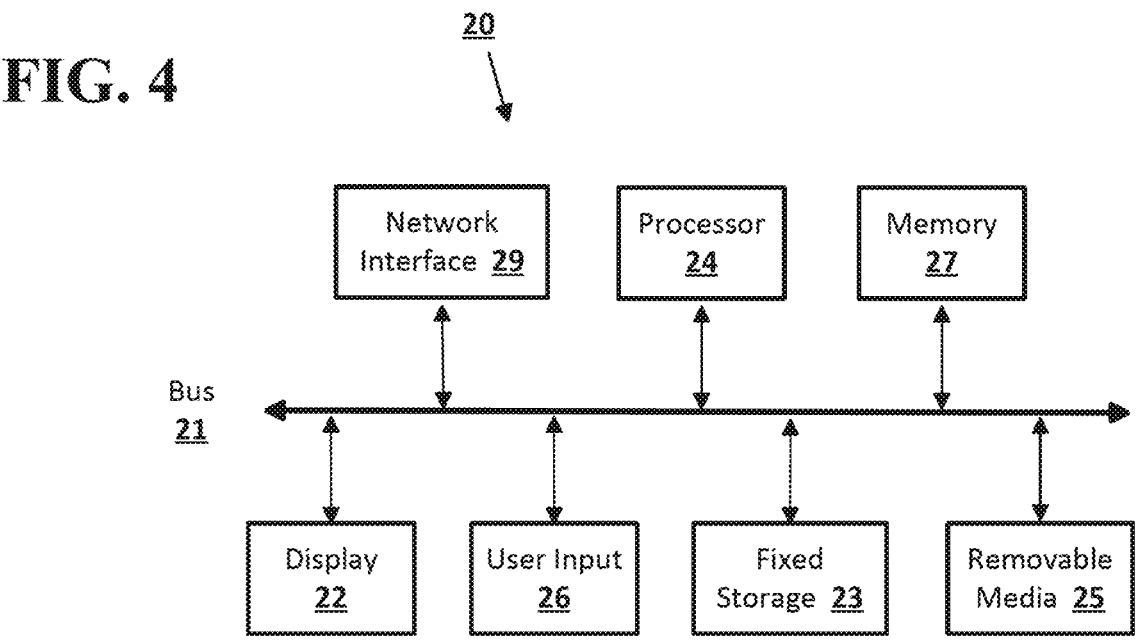
FIG. 4 illustrates a computing device according to an embodiment of the disclosed subject matter.

Embodiments of the presently disclosed subject matter may be implemented in and used with a variety of component and network architectures. FIG. 4 is an example computing device 20 suitable for implementing embodiments of the presently disclosed subject matter. The device 20 may be, for example, a desktop or laptop computer, or a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components, which may include RAM, ROM, and other memory, as previously noted. Typically, RAM is the main memory into which an operating system and application programs are loaded. A ROM or flash memory component can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the computer to communicate with other computers via one or more local, wide-area, or other communication networks, as described in further detail below.

Many other devices or components (not shown) may be connected in a similar manner (e.g., document scanners, digital cameras and so on). Conversely, all the components shown in FIG. 4 need not be present to practice the present disclosure. The components can be interconnected in different ways from that shown. The operation of a computer such as that shown in FIG. 4 is readily known in the art and is not discussed in detail in this application. Code to implement the present disclosure can be stored in computer-readable storage media such as one or more of the memory 27, fixed storage 23, removable media 25, or on a remote storage location.

Figure 5:
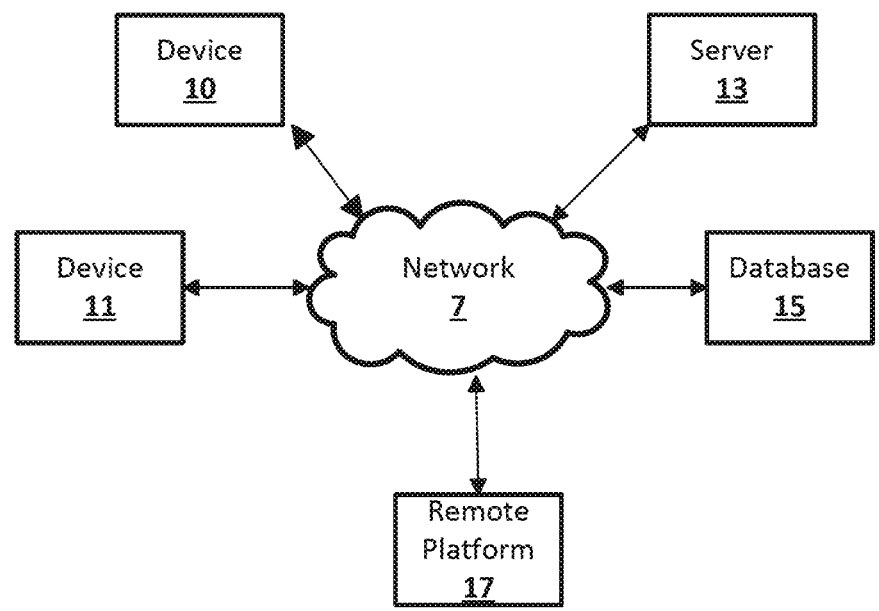
FIG. 5 illustrates a network configuration according to an embodiment of the disclosed subject matter.

FIG. 5 shows an example network arrangement according to an embodiment of the disclosed subject matter. One or more devices 10, 11, such as local computers, smart phones, tablet computing devices, and the like may connect to other devices via one or more networks 7. Each device may be a computing device as previously described. The network may be a local network, wide-area network, the Internet, or any other suitable communication network or networks, and may be implemented on any suitable platform including wired and/or wireless networks. The devices may communicate with one or more remote devices, such as servers 13 and/or databases 15. The remote devices may be directly accessible by the devices 10, 11, or one or more other devices may provide intermediary access such as where a server 13 provides access to resources stored in a database 15. The devices 10, 11 also may access remote platforms 17 or services provided by remote platforms 17 such as cloud computing arrangements and services. The remote platform 17 may include one or more servers 13 and/or databases 15.

Figure 6:
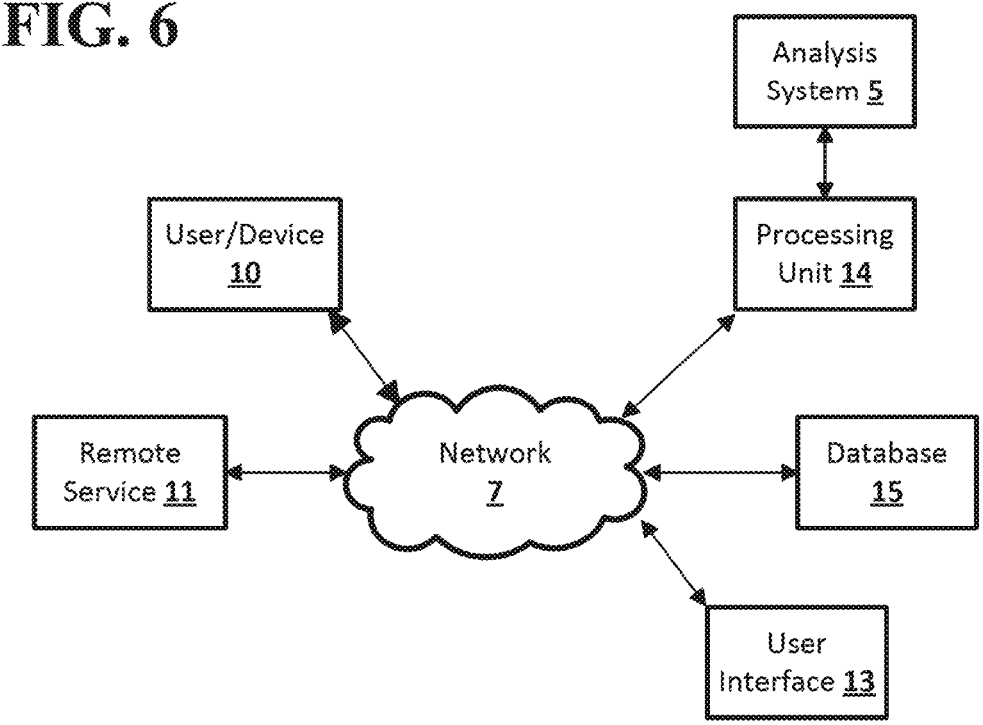
FIG. 6 illustrates an example network and system configuration according to an embodiment of the disclosed subject matter

FIG. 6 shows an example arrangement according to an embodiment of the disclosed subject matter. One or more devices or systems 10, 11, such as remote services or service providers 11, user devices 10 such as local computers, smart phones, tablet computing devices, and the like, may connect to other devices via one or more networks 7. The network may be a local network, wide-area network, the Internet, or any other suitable communication network or networks, and may be implemented on any suitable platform including wired and/or wireless networks. The devices 10, 11 may communicate with one or more remote computer systems, such as processing units 14, databases 15, and user interface systems 13. In some cases, the devices 10, 11 may communicate with a user-facing interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to a web browser client on a user device 10, and a computer-readable API or other interface is provided to a remote service client 11.

The user interface 13, database 15, and/or processing units 14 may be part of an integral system, or may include multiple computer systems communicating via a private network, the Internet, or any other suitable network. One or more processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general-purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method, comprising:
providing each tenant of a plurality of tenants with a respective isolated virtual environment having tenant specific dedicated data storage, each respective isolated virtual environment configured to provide logical separation from all other respective isolated virtual environments of each tenant;
providing each tenant of the plurality of tenants with a respective graphical user interface that displays a data object from the tenant specific dedicated data storage associated with a respective tenant of the plurality of tenants;
associating two or more of the plurality of tenants via a shared communication channel with a second shared data storage comprising a collaborative data object, the shared communication channel and the second shared data storage defining a shared tenant space;
embedding, in each respective graphical user interface of the two or more of the plurality of tenants, the collaborative data object;
providing a custom logic configured to
detect a changed record in a first tenant specific dedicated data storage associated with the shared tenant space, and
propagate the changed record to a second tenant specific dedicated data storage associated with the shared tenant space, thereby bypassing the logical separation between the respective isolated virtual environment of each tenant; and
displaying a real-time indication of a user of one of the two or more of the plurality of tenants one of viewing or editing the collaborative data object via the shared communication channel.

2. The computer-implemented method of claim 1, wherein each tenant of the plurality of tenants may upload the data object from the tenant specific dedicated data storage associated with the respective tenant into the shared tenant space via the shared communication channel at a same time.

3. The computer-implemented method of claim 1, wherein each tenant of the plurality of tenants may view the data object via the shared tenant space via the shared communication channel at a same time.

4. The computer-implemented method of claim 1, wherein each tenant of the plurality of tenants may co-author the data object with another tenant via the shared tenant space via the shared communication channel at a same time.

5. The computer-implemented method of claim 1, wherein the second shared data storage is outside of each of the respective isolated virtual environments of the plurality of tenants.

6. The computer-implemented method of claim 1, wherein the shared communication channel extends communication between two or more respective isolated virtual environments of the plurality of tenants.

7. The computer-implemented method of claim 1, wherein providing each tenant of the plurality of tenants with the respective graphical user interface further includes providing the respective graphical user interface within the respective isolated virtual environments of the plurality of tenants.

8. A system for collaborating between two or more tenants in a system having a plurality of tenants, the system comprising:
a processor; and
a memory in communication with the processor, the memory storing a plurality of instructions executable by the processor to cause the system to:
provide each tenant of a plurality of tenants with a respective isolated virtual environment having tenant specific dedicated data storage, each respective isolated virtual environment configured to provide logical separation from all other respective isolated virtual environments of each tenant;

provide each tenant of the plurality of tenants with a respective graphical user interface that displays a data object from the tenant specific dedicated data storage associated with a respective tenant of the plurality of tenants;

associate two or more of the plurality of tenants via a shared communication channel with a second shared data storage comprising a collaborative data object, the shared communication channel and the second shared data storage defining a shared tenant space;

embed, in each respective graphical user interface of the two or more of the plurality of tenants, the collaborative data object;

provide a custom logic configured to
    detect a changed record in a first tenant specific dedicated data storage associated with the shared tenant space, and
    propagate the changed record to a second tenant specific dedicated data storage associated with the shared tenant space, thereby bypassing the logical separation between the respective isolated virtual environment of each tenant; and
    display a real-time indication of a user of one of the two or more of the plurality of tenants one of viewing or editing the collaborative data object via the shared communication channel.

9. The system of claim 8, wherein each tenant of the plurality of tenants may upload the data object from the dedicated data storage associated with the respective tenant into the shared tenant space via the shared communication channel.

10. The system of claim 8, wherein each tenant of the plurality of tenants may view the data object via the shared tenant space via the shared communication channel.

11. The system of claim 8, wherein each tenant of the plurality of tenants may co-author the data object with another tenant via the shared tenant space via the shared communication channel.

12. The system of claim 8, wherein the second shared data storage is outside of each of the respective isolated virtual environments of the plurality of tenants.

13. The system of claim 8, wherein the shared communication channel extends communication between two or more respective isolated virtual environments of the plurality of tenants.

14. The system of claim 8, wherein providing each tenant of the plurality of tenants with the respective graphical user interface further includes providing the respective graphical user interface within the respective isolated virtual environments of the plurality of tenants.

* * * * *